Patented Dec. 22, 1953

2,663,646

UNITED STATES PATENT OFFICE 2,663,646

BALL MILLED HIGH CALCIUM LIME AND PROCESS OF MAKING THE SAME

Harry N. Huntzicker, Evanston, Manvel C. Dailey, Elmhurst, and Bradford R. Minnis, Glenview, Ill., assignors to United States Gypsum Company, Chicago, Ill., a corporation of Illinois No Drawing. Application March 17, 1951, Serial No. 216,266

5 Claims. (Cl. 106—118)

The present invention relates to improvements in hydrated lime, particularly such as has a high immediate plasticity.

More particularly the invention relates to the process of producing a dry finely divided hydrated lime which is high in calcium and which has a plasticity shortly after being gauged with water of at least that required for a so called "finishing lime," that is to say one which has a plasticity of 200 or better as measured on the Emley plasticimeter.

Plastic limes which have such a degree of plasticity have been allegedly made in the past, but as a matter of fact they invariably were predicated upon a lime which was not high in calcium but rather was a calcined dolomite or at least a dolomitic lime derived from dolomitic limestone.

In the prior art processes of producing plastic magnesia-containing lime, it has been the practice to hydrate the corresponding mixed oxides of magnesium and calcium by a system which involved either the hydration of the mixed oxides under pressure at above the boiling point of water or else at least to hydrate the calcium oxide portion of the lime in a hydrator which operates at ordinary atmospheric pressure, such as for instance a Schaffer hydrator which, however, left the magnesium oxide component substantially unhydrated. Such a partially hydrated lime was then placed in a suitable pressure type vessel or autoclave in which sufficient water was added to hydrate the magnesium oxide portion and the hydration either started by heating or by feeding the oxide mixture into the hydrator while hot enough to initiate the hydration of the magnesium oxide.

After the dolomitic or magnesian lime had thus been hydrated as to both of the alkaline earth metal oxides therein contained, it was then ball milled preferably by means of steel balls having a diameter of say from about ¼" to about 1" as fully set forth in the patent to Huntzicker and Norman No. 2,408,647.

It has now been found that when operating upon a high calcium lime, that is to say one which contains relatively small amounts of magnesium oxide or perhaps even none at all, and recourse was had to the grinding of such a high calcium lime in a ball mill for the purpose of inducing the desired degree of plasticity therein, this could not be attained, but that something in addition was necessary. Thus it was found that if the ball milling is carried out while the hydrated high calcium lime contains admixed therewith from about 1% to about 15% by weight thereof of a siliceous substance, preferably some form of plastic clay or the like, satisfactory development of plasticity could be obtained in a continuously operating ball mill into which the hydrated high calcium lime was fed at one end and discharged at the proper degree of plasticity at the other end.

The plasticities attainable by practicing the present invention are above 200, which is the minimum acceptable as a finishing lime. The plasticity figures are those determined in accordance with the well known Emley plasticimeter which is thoroughly wel known in the art and measures the plasticity of a patty of the lime under definite and controlled conditions. For further details as to the operation of such a device reference might be directed to the American Society For Testing Material which has issued full instructions for the operation of the Emley plasticimeter, (see their Test Specification C110–49).

Now, it was further discovered that it is not the mere grinding of the hydrated high calcium lime in the presence of the siliceous material which is necessary, but also that it is esesntial that certain operating conditions be adhered to. One of these is that the hydrated lime at the time of grinding not be done dry. In other words, it must still contain about $\frac{1}{10}$ of 1% and preferably from $\frac{2}{10}$ of 1% to 1% of residual moisture in the form of water. By moisture we mean not the hydroxyl portions of the hydrated lime, but water in excess of the OH groups which are united with the lime. A further necessity was to accomplish the grinding in a ball mill which was provided with means to control its temperature, for the ball milling, by reason of the friction involved, heats up the mill and its contents so that unless precautions were taken a temperature would soon be obtained which would drive out the last vestiges of water so that the lime would be ground under bone dry conditions, which would not be productive of the desired results.

Accordingly the usual type of ball mill may be provided with means for running or spraying water onto its outer periphery during its rotation so as to carry away the heat which is developed as a result of the operation of the mill. It was found by actual commercial operation that the temperature must not exceed about 87° C., for as soon as it goes higher the moisture completely evaporated out of the lime, and therefore the desired degree of immediate plasticity is not attained.

While mention is made of the generic term "siliceous substance" the most useful ingredient for this purpose has been found to be a plastic clay. However, asbestol, which is a very finely divided grade of asbestos, or similar material or the like may be employed.

Operating under such conditions that balls of the size indicated in the Huntzicker and Norman patent are used and the mill is operated at a fair rate of speed, it was found that the temperature was quite critical.

Predicating the experiments upon hydrated high calcium limes which contained between 3% and 5% of clay, the following results were obtained:

Table I

| Temperature | Emley plasticity |
|---|---|
| 85° C. (cooling water on outside of mill cut off) | 271 |
| 87° C. | 267 |
| 90° C. | 201 |
| 95° C. | 215 |
| 100° C. | 206 |
| 108° C. (1 hour later) | 143 |

The mill was started cold and satisfactory plasticities were obtained until the mill reached about 85° C., whereafter the cooling water was deliberately cut off in order to let the temperature rise in order to demonstrate the effect of rising temperature upon the attainable Emley plasticity. Of course during this operation the lime was passing continuously through the mill.

For the first hour, starting with a cold mill, it is evident that the temperature is the completely controlling factor. As the temperature rises, the presence of the clay becomes more and more important. Any commercial installation of a ball mill or tube mill to be economically feasible requires that the mill be operated for long continuous periods of time, usually weeks and sometimes months without interruption. The presence of the clay or similar siliceous material together with control of the temperature make possible the continuous operation necessary for obvious economic reasons.

The temperature of the mill when starting was the same as that of the circumambient air, namely about 20° C. Further laboratory tests have also indicated that the presence of the clay or equivalent siliceous substance increases the plasticity sometimes as much as about 70 points or more, which of course is a very great commercial advantage.

Table II

| Added material | Amount percent by weight | Plasticity, Emley | |
|---|---|---|---|
| None | 0 | 40 | Not milled at all. |
| Do | 0 | 171 | With milling in accordance with present invention. |
| T-7 Kraft clay | 5 | 265 | Do. |
| Georgia clay | 5 | 263 | Do. |
| Harbison-Walker No. 1 clay | 5 | 254 | Do. |
| Harbison-Walker No. 2 clay | 5 | 286 | Do. |
| Alliance Ohio clay: | | | |
| (Unground when added) | 5 | 245 | Do. |
| (Ground before adding) | 5 | 289 | Do. |
| Georgia kaolin | 5 | 260 | Do. |
| North Carolina clay | 5 | 307 | Do. |
| Wagner 50 C filler (marl clay) | 5 | 258 | Do. |
| Asbestol (ground) | 5 | 241 | Do. |
| Inland firebrick clay (from Cleveland, Ohio) | 5 | 289 | Do. |
| Inland firebrick clay | 10 | 302 | Do. |
| Bentonite | 2 | 227 | Do. |
| Do | 5 | 265 | Do. |
| Do | 5 | 120 | Not milled. |
| Attasol clay | 5 | 76 | Do. |
| Do | 5 | 251 | Milled. |

From Table II it will be seen what a difference there is between not milling at all, and milling without any additive substance. Thus when the lime was not milled it had a plasticity of only 40. Milling it without any additive substance brought it up to 171, which is still too low for commerical sale and utilization. However, when milling with certain types of clay, while there is a variance in plasticities obtained, they all are well above 225, and in most cases even above 250. Notice, particularly, that although 5% of Bentonite was added, but without milling, the plasticity was only 120, while with Attasol clay and without milling the plasticity was only 76, whereas with milling or grinding it rose to 251. This therefore demonstrates quite effectively the importance not only of the addition of the siliceous material, but also the control of the temperature of the mill and also the effect of moisture. If the lime is allowed to dry down below $\frac{1}{10}$ of 1% of moisture the plasticity cannot be brought above 200.

This is important by reason of the prior art teachings of a certain patent to Welch No. 1,410,087. This patent describes the treatment of so called mason's hydrated lime which comprises grinding it in the presence of so called drying agents. A ball mill is used, but the grinding time is two hours and it is merely stated that the product will be sufficient to meet the requirements for finished hydrate in accordance with the American Society of Testing Materials, Test Specification No. C 110-49. Welch appears to be under the impression that it was necessary completely to remove even the last vestige of moisture. Therefore he describes the grinding of the lime in the presence of a "drying agent" which he states destroys the water envelopes surrounding the groups of the hydrated lime, whereafter the lime breaks down into individual particles. For this purpose he uses such substances as will absorb water, particularly clay, calcined gypsum, quicklime, magnesia, etc.

However, the present invention, as the tables and specification clearly demonstrate, is a distinct departure from the teachings of Welch in that it points in just exactly the opposite direction, namely, the vital necessity for keeping a small amount of moisture in the product, and also the importance of controlling the temperature.

In the hereunto appended claims we have used a term co-ground, by which we intend to imply that the added substance was ground with the hydrated lime. While this is a process limitation, we have clearly demonstrated that merely adding the siliceous substance to the lime does not yield the desired product.

The use of equivalents known to chemists and those familiar with the art are of course to be construed as within the contemplation and scope of the invention.

We claim:

1. Process of producing immediately plastic hydrated high calcium lime which comprises ball milling hydrated high calcium lime at a moisture content of from about 0.1% to not exceeding about 1.0% at a temperature not exceeding about 87° C., said hydrated lime containing admixed therewith during the grinding from about 1% to about 15%, by weight of the lime, of a natural uncalcined siliceous substance.

2. Process of producing immediately plastic hydrated high calcium lime which comprises mixing therewith from about 1% to about 15% by weight thereof of a natural uncalcined plastic siliceous substance and ball milling the mixture under controlled temperature conditions so as not to exceed a temperature of about 87° C. as to the contents of the mill, and so as not to lower the moisture content of the hydrated lime in the mill below about 0.1% by weight.

3. Process of producing immediately plastic hydrated lime which comprises passing a mixture of hydrated lime with from about 1% to about 15% by weight thereof of an uncalcined plastic clay through a ball mill while cooling said mill to prevent a rise in temperature of the contents thereof above about 87° C. whereby to maintain the moisture content of the material in the mill between about 0.1% and about 1.0% by weight.

4. Plastic hydrated high calcium lime containing from about 1% to about 15% by weight of a natural plastic siliceous substance, produced by cogrinding of said substance with said lime, while the lime contains a moisture content of from about 0.1% to not exceeding about 1.0%, at a temperature not exceeding about 87° C., and characterized by having an immediate plasticity of at least 200 as measured by the Emley plasticimeter.

5. Plastic hydrated high calcium lime as defined in claim 4, in which the uncalcined plastic siliceous substance is clay.

HARRY N. HUNTZICKER.
MANVEL C. DAILEY.
BRADFORD R. MINNIS.

References Cited in the file of this patent
UNITED STATES PATENTS

| Number | Name | Date |
|---|---|---|
| 1,410,087 | Welch | Mar. 21, 1922 |
| 1,912,883 | Blank | June 6, 1933 |
| 2,408,647 | Huntzicker et al. | Oct. 1, 1946 |